May 8, 1962
M. A. FERGUSON
3,034,057
UNIVERSAL WELD CURRENT ANALYZER
Filed Jan. 16, 1959
3 Sheets-Sheet 1
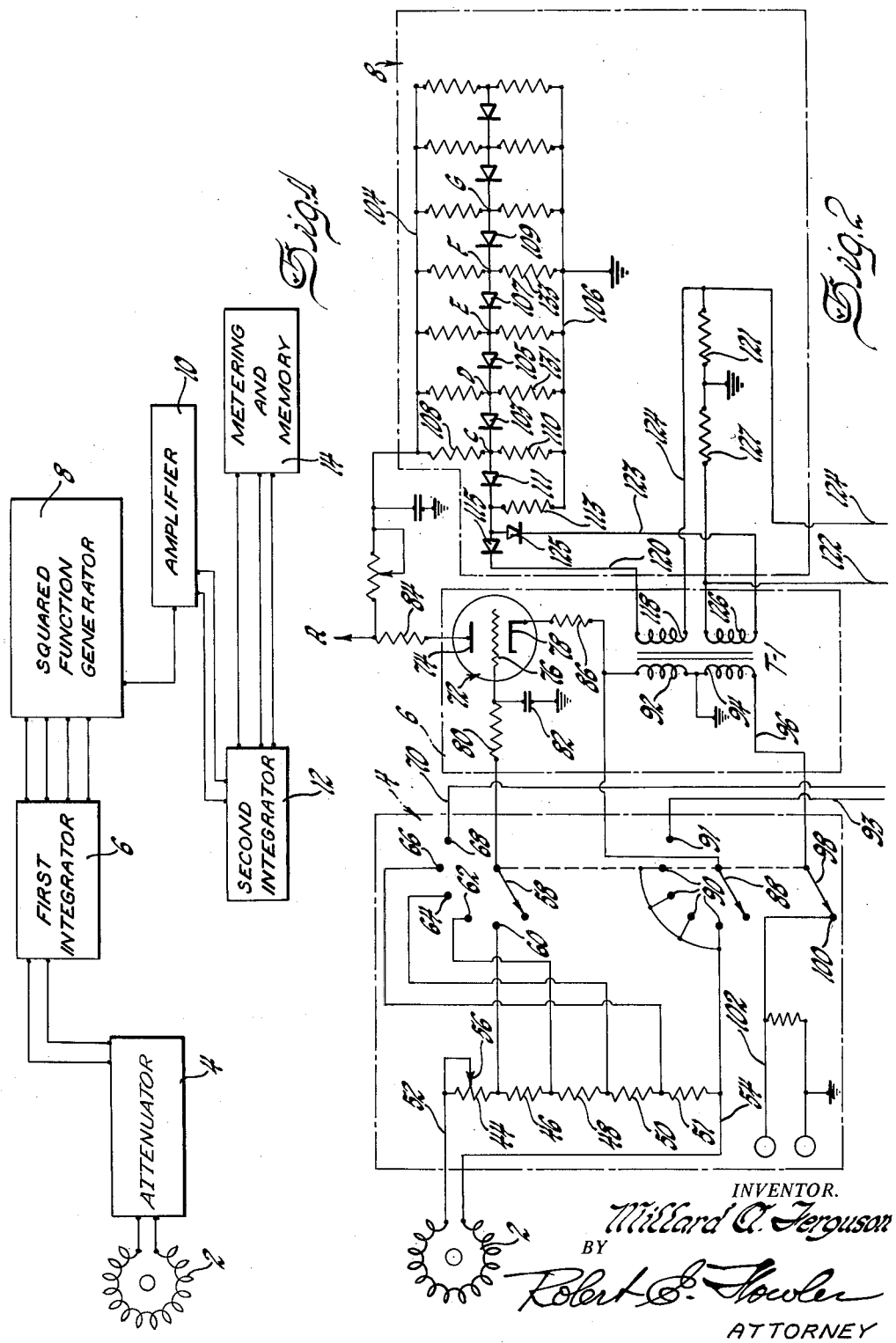
INVENTOR.
Millard A. Ferguson
BY
Robert E. Fowler
ATTORNEY May 8, 1962 M. A. FERGUSON 3,034,057
UNIVERSAL WELD CURRENT ANALYZER
Filed Jan. 16, 1959 3 Sheets-Sheet 2

INVENTOR.
Millard A. Ferguson
BY
Robert E. Fowler
ATTORNEY

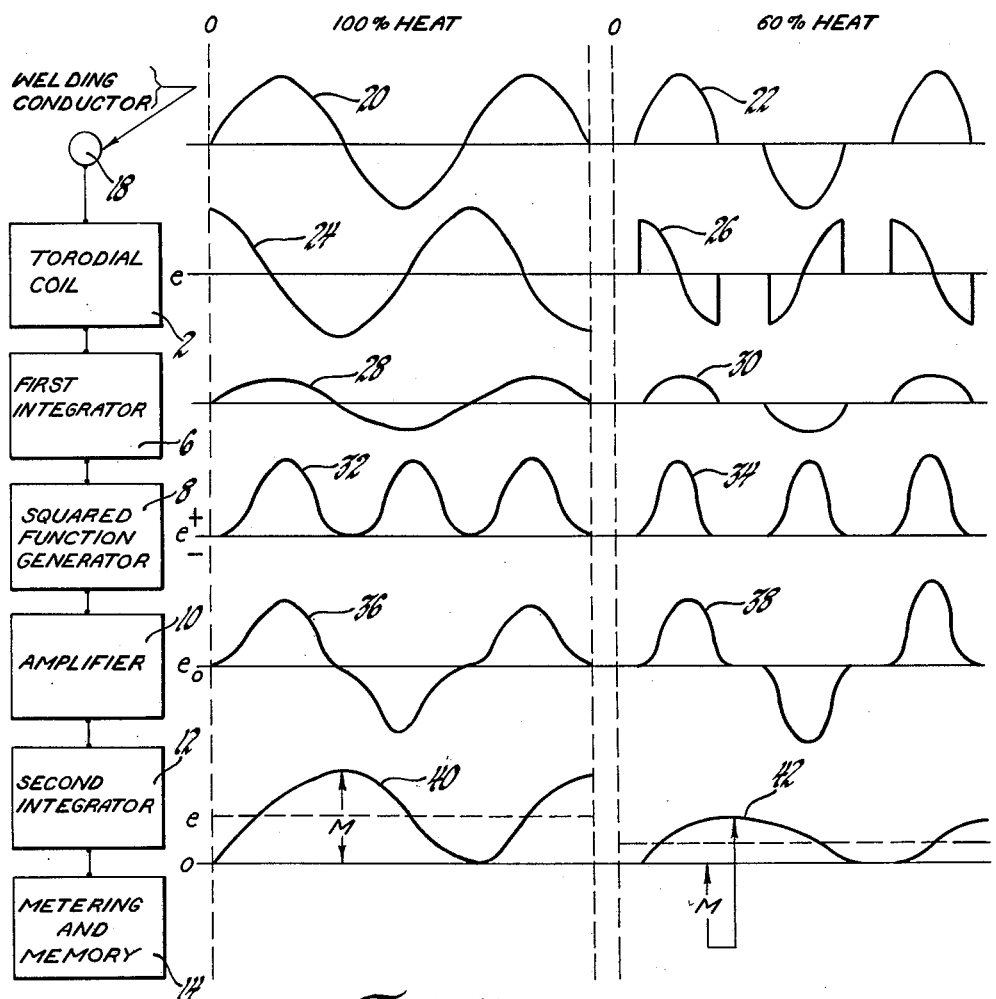

3,034,057
UNIVERSAL WELD CURRENT ANALYZER
Millard A. Ferguson, Utica, Mich., assignor to General Motors Corporation, Detroit, Mich., a corporation of Delaware
Filed Jan. 16, 1959, Ser. No. 787,277
4 Claims. (Cl. 324—132)

This invention relates to measuring and indicating means and more particularly to means for accurately measuring and indicating secondary welding current in a production welder regardless of whether or not the current has been phase shifted to provide heat control.

Many different high current measuring means have in the past been designed and some have been useful in measuring and indicating the secondary welding current which flows to produce welds when such current is a pure sine wave and not phase shifted for heat control. However, no indicating systems are known which will give accurate reading of secondary current in a welder when phase shifting is applied to vary the amount of heat applied for welding.

It is essential in producing duplicate welds that are uniform in quality that the same welding conditions exist, namely, current, time, and pressure for the weld. In order that duplicate welds are made, welding machines should be periodically checked to assure that none of these factors are varied. Also, in initially installing a new machine or adjusting a machine to accommodate a new part, it is necessary to carefully adjust the current so that burning will not occur and yet a firm weld be obtained. Many other instances occur in which it is necessary to accurately check or measure the secondary welding current.

It is therefore an object in making this invention to provide a device for accurately measuring secondary welding current in a welding machine under either phase shifted or non-phase shifted conditions.

It is a further object in making this invention to provide a secondary current meter which can be simply attached to a welding machine without disturbing the normal welding operation.

It is a further object in making this invention to provide a current meter for a welding machine which will measure phase shifted current in terms of R.M.S. values which is portable, will operate from available power supply, and retains a reading long enough to be easily noted.

With these and other objects in view which will become apparent as the specification proceeds, my invention will be best understood by reference to the following specification and claims and the illustrations in the accompanying drawing in which:

FIGURE 1 is a block diagram showing the essential portions of my novel weld current meter.

FIGURES 2 and 2A are parts forming a complete circuit diagram of a welding current meter embodying my invention; and FIGURE 3 is a set of curves illustrating the wave forms appearing at different portions of the system together with an associated block diagram indicating the location of the waves so that the form at any point can be quickly and readily ascertained.

Figure 2A:
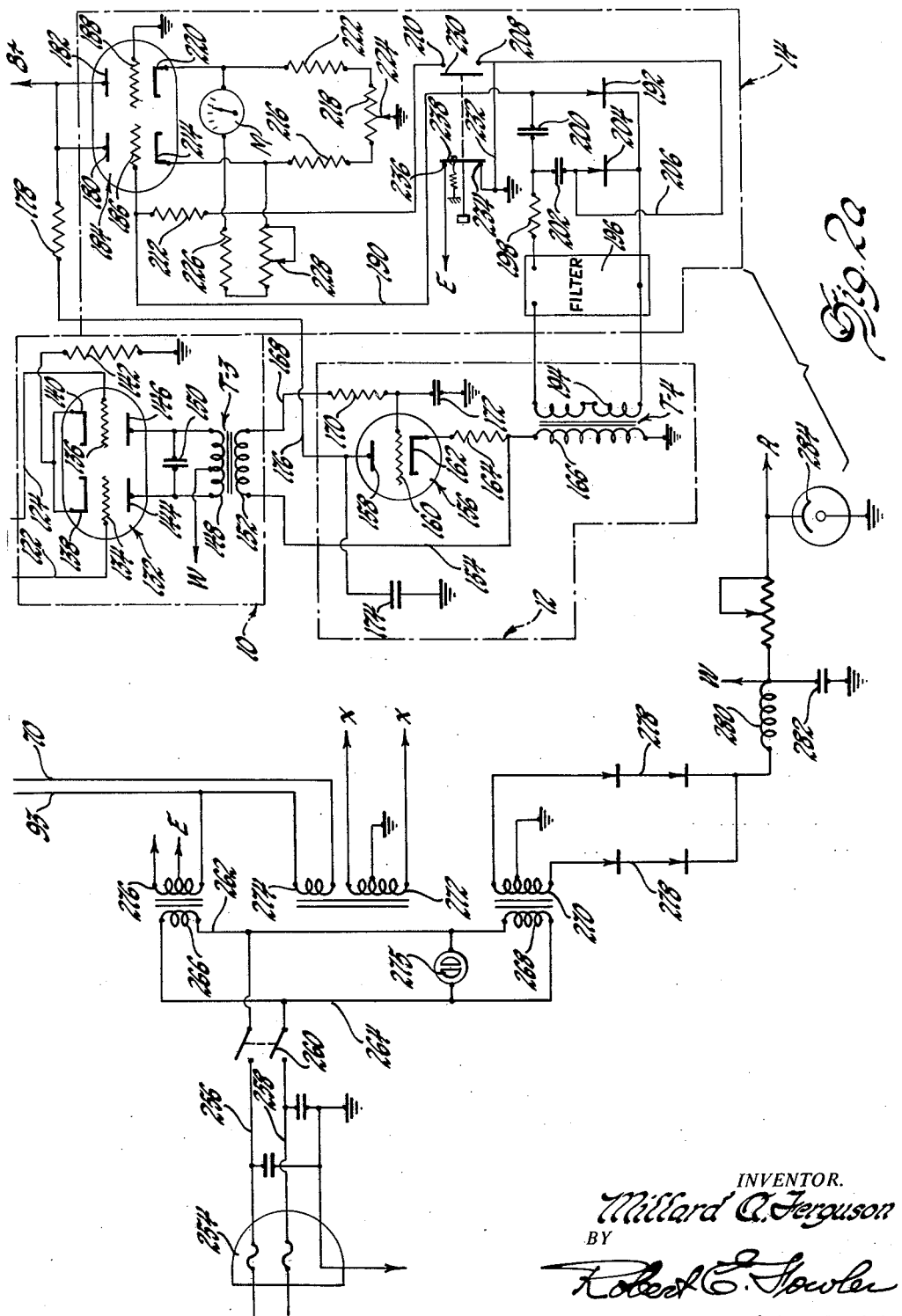

The principal features of this current measuring system consist generally in obtaining a signal voltage or wave which is proportional to the rate of change of the welding current, putting said signal voltage through three stages of electronic circuits to obtain an R.M.S. value of the welding current and then indicating its value.

More specifically referring to FIGURE 1, a toroidal coil 2 is placed around a part of the secondary welding circuit and has a voltage induced therein by the flow of welding current which is proportional to the differential of said secondary current. This voltage is applied to an attenuator 4 and thence to a first integrator 6. This stage 6 changes the toroidal output voltage back to a voltage that is proportional at all times to the welding current and by integrating a voltage that has been differentiated, voltage of similar wave form to that of the original current is obtained. This signal is next applied to a squared function output circuit 8 which generates a D.C. output voltage proportional to the square of the input voltage. This signal is next amplified in amplifier 10 which converts the low amplitude D.C. pulses into high level A.C. signals. These are then applied to a second integrator 12 where the signals are again integrated to provide an output that is now proportional to the current squared. This signal is a voltage with a peak to peak value whose square root is proportional to the R.M.S. value of the welding current, and this is lastly applied to the memory and indicating meter 14.

It is relatively simple to obtain a signal voltage from a welding circuit which is proportional to the R.M.S. value of the welding current if the current flowing is substantially a sine wave and has not been phase shifted to control the heat. However, where the weld heat has been adjusted to less than 100% by shifting the phase so that use is made of only a fraction of each half cycle the wave form becomes irregular, the peak value is not strictly proportional to the R.M.S. value and it is more difficult to obtain signals proportional to the R.M.S. value of the current. The general formula for R.M.S. current is $$I_{R.M.S.} = \sqrt{\frac{1}{T} \int_0^T i^2 dt}$$

In the present measuring circuit the squared function generator is used to give a signal proportional to the square of the current, the second integrator provides the integration from O to time period T and the rest of the formula is taken care of in the meter circuit. By the use of this system an indicating signal proportional to the R.M.S. current can be obtained for any current wave shape.

Having now described the weld current analyzer in general, reference is made to FIGURE 3 which specifically identifies the wave forms obtained at the various circuit locations. At the lefthand side of FIGURE 3, are block diagrams labelled to identify the certain parts of the system in horizontal alignment with each of two columns of wave forms which are found at these locations, one representing a sine wave of non phase shifted current labelled 100% heat and the second column spaced to the right showing a phase shifted current which might be any percentage but for illustrative purposes is shown at 60% heat. At the top of FIGURE 3 at the left, there is shown diagrammatically a welding conductor 18. Curve 20 just to the right thereof, shows the sine wave of current flowing in the secondary circuit of the welder for non-phase shifted 100% heat. Farther to the right on the same horizontal line in the graph there is shown a plurality of disconnected pips 22 which are obtained when phase shift is employed to decrease the total heat applied. These are representative of the welding current flowing in the secondary circuit under these circumstances.

When the toroidal coil 2 is placed around a portion of the secondary circuit with the indicated current flowing therein, there is induced in said coil a voltage shown graphically as 24 which is proportional to the rate of change of the current 20 when there is no phase shift. When a phase shift is utilized, voltages such as those diagrammatically shown at 26 are induced in the toroidal coil by the pips 22. The voltage from the toroidal coil is then applied to the first integrator 6 and this stage changes the output voltage back to a voltage which is proportional at all times to the welding current and when no phase shift is applied, is shown at 28. This curve therefore resembles the current curve as originally shown at 20 but does not have the same amplitude, being less. Similarly, when phase shift is used, smaller pips 30 which again resemble pips 22 at the top of the column are obtained.

The output of the first integrator is fed into the squared function generator 8 and this circuit takes the voltage from the integrator and modifies the same by squaring it as shown in curve 32 for 100% heat and in like manner the partial heat phase shifted pips at 34. These waves are then fed into the amplifier 10 and produce high amplitude A.C. output voltages 36 and 38 respectively as shown by the curves opposite said amplifier. These voltages are next applied to a second integrator 12 which produces waves 40 and 42 whose peak value is proportional to the current squared. This output is at this point a voltage having a peak to peak value as shown at M whose square root is proportional to the R.M.S. value of the initial welding current. This signal is lastly applied to the metering and memory section 14 and the indicating meter is read to give an accurate reading of the welding current under any conditions.

Referring now to the complete circuit diagram of the weld current analyzer as shown in FIGS 2 and 2A, there is shown therein the same torroidal pickup coil 2 which is connected to the attenuator section enclosed by dash and dotted outlines at 4. This section includes a voltage divider including a plurality of resistances 44, 46, 48, 50 and 51 which are connected in series across lines 52 and 54 which extend from the terminals of the torroidal coil 2. Resistance 44 also has an adjustable tap 56 which can be moved over the same to shunt out a portion of the resistance and therefore change its effect in the circuit. This voltage divider is connected to a multi-position switch including a movable arm 58 and a plurality of stationary contacts 60, 62, 64, 66 and 68 which the arm 58 may engage in different positions. Contact 60 is connected to an intermediate point between resistances 44 and 46; contact 62 to an intermediate point between resistances 46 and 48; contact 64 to an intermediate point between resistances 48 and 50; and contact 66 to a similar intermediate point between resistances 50 and 51. Stationary contact 68 of this multi-position switch is connected through line 70 to a part of the voltage supply which will be described later and is for calibration purposes. Movement of the movable arm 58 around to engage the various stationary contacts changes the proportionate amount of the signal picked up by the torroidal coil and fed to the first integrator stage.

The first integrator is shown in dash and dotted outlines at 6 and includes an electron tube 72 having a plate 74, control grid 76, and cathode 78. The movable arm 58 of the selector switch is directly connected through a resistance 80 to the control grid 76 of the tube 72. A bypass condenser 82 is connected between said grid and ground to integrate the signals. The plate is supplied with the proper voltages through limiting resistor 84 and thence to a power supply indicated by A which will be connected to another portion of the power circuit similarly indicated. This is to simplify the circuit diagram. The cathode 78 of the tube 72 is connected through resistance 86 with movable switch arm 88 which is mechanically ganged with the first rotary switch arm 58. This second arm 88 is adapted to move over a series of stationary contacts 90, all of which are conductively connected together and to the line 54 from the torroidal coil. Thus, as soon as the arms 58 and 88 are moved from their original deenergized position, arm 88 will connect line 54 to the cathode string of the tube 72, for any other position of the switch. Switch arm 88 may also engage stationary contact 91 which is a calibrating contact similar to contact 68 for switch arm 58. Contact 91 is connected through line 93 with a further portion of the voltage supply system to be described. The switch arm 88 is likewise connected to one terminal of the primary coils 92 and 94, which are the primary coils of a transformer T-1 and are connected in series with the center tap grounded. The opposite terminal is connected through line 96 to a third rotary ganged switch arm 98 which moves simultaneously with arms 58 and 88 as shown by the dash line connecting the three. Arm 98 engages stationary contact 100 at one position such as that shown and is provided in order to feed in calibrating signals through the circuit 102 connected thereto. During normal metering, this circuit is disconnected.

Thus, the effective signals generated in the torroidal coil by the flow of secondary current in the welder are adjusted in strength by movement of the switch arms 88 and 58 attenuated and supplied to the input of the tube 72 where they are integrated. This tube and its associated circuit including resistance 80 and condenser 82 in the input and resistance 86 and transformer T-1 in the output is known as a boot strap integrator. Such integrators are known and their operation described in a book entitled "Wave Forms," vol. 19 of the Radiation Laboratories Series published by McGraw-Hill in 1949. The output of the integrator 6 is applied to the squared function generator 8 through the transformer T-1. This squared function generator 8 consists of a plurality of pairs of precision resistors connected in series across the power line 104 and ground line 106. The value of these sets of resistors varies from left to right, those of higher value being shown at the left. The purpose of this section is to produce a squaring effect for the current. At the intermediate point for each pair of resistances, such as CDEFG, a voltage is developed by the application of power across the pair from line 104 to ground. These voltages increase from left to right starting, for example, as a fraction of a volt and increasing to something in excess of six volts at the righthand end. Thus, resistances 108 and 110 connected across the power line 104 and ground line 106 would develop, for example, one volt at point C. A plurality of rectifiers 103, 105, 107 and 109 are connected between points C and D, D and E, E and F, and F and G. A further rectifier 111 is connected to point C and to the upper terminal of resistor 113, the opposite terminal of which is connected to ground line 106.

The output of the first integrator section is applied to primary 92 of transformer T-1 in the cathode line of tube 72. This transformer has a pair of primary windings 92 and 94 previously described, and a pair of secondary windings 118 and 126. Winding 118 has one terminal connected through line 120 and rectifier 115 to one end of resistor 113. The other terminal of secondary winding 118 is connected directly through line 124 to one control electrode 136 of the duo-triode tube 132 in amplifier section 10. A biasing resistor 121 is connected between line 124 and ground across which the control voltage representative of one-half cycle is developed. In like manner, one terminal of the second secondary 126 is connected through line 123 and rectifier 125 to the same end of resistor 113. The remaining terminal of winding 126 is connected through line 122 to the other control grid 134 of the second one-half of the duo-triode amplifying tube 132. Biasing resistor 127 is connected between line 122 and ground and across this resistance a control voltage is developed proportional to the amplitude of the alternate half cycle.

As the integrated voltage across primary 92 increases, a voltage is developed across secondary 118 that is so poled as to match or exceed the voltages at C, D, E, etc. and therefore create an increasing number of parallel paths through resistances 110, 131, 133, etc., the greater the amplitude. With more resistances in parallel the lower will be the effective resistance in circuit and the greater the flow of current so as the voltage at secondary 118 increases, an effective squaring of the current is obtained. This squared current flows through resistance 121 to ground also, and this develops an effective squared voltage on line 124 to apply to control grid 136. The circuit in which this control voltage is developed for the first half cycle may be traced as follows: ground, line 106, through several resistances 113, 110, 131 or 133 depending on the signal voltage, rectifier 115, line 120, secondary winding 118, line 124, resistance 121 to ground. Thus, the signal voltage applied to winding 118 develops an effective squared voltage across resistance 121 which is applied to grid 136. For the next half cycle, an effective squared voltage is developed in the alternate circuit including secondary winding 126 to obtain a biasing voltage across the resistance 127 to be applied to control grid 134 of tube 132. The positive squared function pulses are shown by the waves 32 on the graph of FIG. 3. Thus, each half wave in the output of the first integrator produces a positive pulse for alternate application to the control grids 134 and 136 of tube 132.

Section 10 including tube 132, is an amplifying section, the output of which is applied to the second integrator 12. The input is applied to grids 134 and 136 and the two plates of the tube 144 and 146 are connected to opposite terminals of a primary winding 148 of the transformer T-3, the center tap if which is supplied with power from the main voltage supply indicated as W and later to be described. Condenser 150 is connected across the primary winding 148. The cathodes 138 and 140 are self biased through resistance 142 connected to ground. This section not only amplifies the squared wave form but also changes it back to alternating current as shown at 36 and 38 of FIGURE 3.

Secondary winding 152 of the transformer T-3 to which this signal wave is applied is connected through lines 154 and 168 to the second integrator section 12. This second integrating section which is of the same basic construction as the first integrator section includes an electron tube 156 having a plate 158, a control grid 160 and a cathode 162. The cathode is connected through a biasing resistor 164 and an output transformer winding 166 in series therewith to ground. The line 154 from the transformer winding 152 in the amplifier 10 is connected to an intermediate point between the resistance 164 and the winding 166. The other side of the transformer winding 152 of the amplifier is connected through conductor 168 to one terminal of a resistor 170 which is connected through a series condenser 172 to ground and also directly to the control grid 160 of tube 156. A condenser 174 is connected between the plate 158 and ground, said plate being likewise connected through limiting resistor 178 to the power supply of proper voltage indicated as B+.

The output of the second integrator section 12 is in the wave form shown at 40 or 42 in FIG. 3 and is applied through transformer T-4 to the metering and memory section 14. The primary 166 of the transformer T-4 is in the cathode circuit of tube 156 and supplies the secondary coil 194 with the output signal. The secondary 194 is connected directly across a high pass filter 196 which is designed to pass frequencies above 60 cycles per second. The output of the filter 196 is applied through resistance 198 to a voltage doubler section which includes condensers 200 and 202 and rectifiers 192 and 204. Ground reference for the voltage doubler section is obtained from a point between condenser 202 and rectifier 204 through line 206. From this voltage doubler section the signal is applied to control grid 186 of duo-triode tube 184 by line 190. Plates 180 and 182 of tube 184 are connected to the power supply indicated by B+. Grid 188 of the second triode section is directly grounded.

Cathode 214 is connected through resistance 216 to one terminal of resistance 218. Similarly, cathode 220 of tube 184 is connected through resistance 222 to the remaining terminal of resistance 218. An adjustable tap 224 movable over resistance 218 is grounded. Connected in series circuit across the cathodes 214 and 220 are a meter M, a resistance 226, and a variable resistance 228.

A reset switch is provided which has two armatures 238 and 230, spring biased to the left as shown in FIG. 2A. Armature 238 is adapted to bridge stationary contacts 236 and 234 when in its lefthand position and completes a circuit for one portion of the power supply to be described. This switch is normally closed. The second armature is insulated from the first but mechanically ganged to move with the same and when forced to the right by pressure, bridges the two stationary contacts 208 and 210. Contact 208 is connected to ground and contact 210 through resistor 212 to grid 186. When this switch is closed, the charge is taken off the grid and the meter returns to zero.

In initially setting the device without any input signal, the adjustable tap 224 is moved until there is an equal amount of current flow through each half of the tube 184. Under these conditions there will be no unbalance at the cathodes and the meter M will read zero. As the signal is applied from the output of the voltage doubler more current flows through the lefthand side to unbalance the two and current flows across the meter circuit. The peak voltage obtained from any given input signal remains on the grid 186 for some considerable time so that the operator can easily read it.

The power supply for this system is obtained from a receptacle 254 which can be plugged into any convenient 110 volt system and which supplies power to lines 256 and 258. A master switch 260 having two insulated blades independently connects line 256 to line 262 and line 258 to line 264 to supply power to a power transformer. This power transformer includes a number of different windings, the primary winding being separated into two parts, 266 and 268, both of which are connected across the lines 262 and 264 and which induce voltages in a number of secondary windings 270, 272, 274 and 276. A neon pilot light 275 is connected across lines 264 and 262 to stabilize the supply. The winding 272 supplies power for the various vacuum tube filaments and is merely marked with terminals XX to indicate this. Secondary 274 supplies power to power lines 93 and 70 for calibrating the attenuator section. Secondary 270 is center tap grounded and connected through a rectifier network 278 and also through a filter including a choke 280 and a condenser 282 to supply D.C. power to a point W which is connected to the paired point W in the amplifier section. A voltage regulating section including regulator tube 284 provides regulated D.C. power to a point A which in turn feeds said power to point A in the first integrator section.

In the operation of this system the torroidal coil 2 is placed around one of the welding electrodes through which welding current flows when the welder is operated. The gang switch 58—88—98 is placed in one of its intermediate positions depending on the amplitude of the signal developed. The welder is then operated with the resultant induced current in the coil and development of signal wave forms at the locations as indicated on FIG. 3. The meter M reads a peak value which is proportional to the R.M.S. value of the current regardless of whether it is a full sine wave or is phase shifted for heat control and is retained for a period of time. After reading, the operator may depress the plunger 239 to take off the reading and prepare for the next measurement.

Moving gang switch 58—88—98 to its uppermost position will apply the voltage from secondary 274 of the power transformer directly to the first integrator stage. Movement of this switch to its lowermost position opens all circuits to the attenuator and first integrator and connects some outside signal source plugged into terminals 101 and 103 to the transformer T-1 to calibrate other parts of the equipment.

I claim:

1. In means for measuring current flowing in conductors in which the wave form may be irregular and non-uniform in shape, a pickup coil adapted to be supported in juxtaposition to a conductor carrying current it is desired to measure, said pickup coil having voltages induced therein which are proportional to the differential of the current in the conductor, first integrating means connected to the pickup coil to integrate the signal and obtain a voltage proportional to the current, squared function generating means connected to the first integrating means to provide an effective squared signal, second integrating means connected to the squared function generating means to further integrate the signal and obtain a voltage whose peak is proportional to the R.M.S. current in the conductor and memory indicating means connected to the second integrating means to indicate the R.M.S. value of the current and hold the position for sufficient time to be easily readable.

2. In current measuring means adapted to be utilized with a welding machine having phase shift heat control to measure welding current in a conductor thereof, a pickup coil adapted to be supported in juxtaposition to the conductor carrying current it is desired to measure, said pickup coil having voltages induced therein which are proportional to the differential of the current in the conductor, first integrating means connected to the pickup coil to integrate the signal and obtain a voltage proportional to the current, squared function generating means connected to the first integrating means to provide an effective squared signal, second integrating means connected to the squared function generating means to further integrate the signal and obtain a voltage whose peak is proportional to the R.M.S. current in the conductor, memory indicating means connected to the second integrating means to indicate the R.M.S. value of the welding current and hold it for sufficient time to be easily readable, and grounded switching means connected to the memory indicating means to remove the reading on the same when he switching means is closed to put the same in condition for the next reading.

3. In current measuring means adapted to be utilized with a welding machine having a phase shift heat control to measure welding current in a conductor thereof, a pickup coil adapted to be supported in juxtaposition to the conductor carrying current it is desired to measure, said pickup coil having voltages induced therein which are proportioned to the differential of the current in the conductor, first integrating means connected to the pickup coil to integrate the signal and obtain a voltage proportional to the current, squared function generating means connected to the first integrating means to provide an effective squared signal, second integrating means connected to the squared function generating means to further integrate the signal and obtain a voltage whose peak is proportional to the R.M.S. current in the conductor, filtering means connected to the output of the second integrating means to remove unwanted low frequency, transients voltage doubling means connected to the output of the filtering means, and a balanced bridge indicating circuit including a meter connected to the voltage doubling means to give an indication of the signal applied which is proportional to the R.M.S. welding current.

4. In current measuring means adapted to be utilized with a welding machine having phase shift heat control to measure welding current in a conductor thereof, a pickup coil adapted to be supported in juxtaposition to a conductor carrying current it is desired to measure, said pickup coil having voltages induced therein which are proportional to the differential of the current in the conductor, first integrating means connected to the pickup coil to integrate the signal and obtain a voltage proportional to the current, squared function generating means connected to the first integrating means to provide an effective squared signal, second integrating means connected to the squared function generating means to further integrate the signal and obtain a voltage whose peak is proportional to the R.M.S. current in the conductor, filtering means connected to the output of the second integrating means to remove unwanted low frequency transients, voltage doubling means connected to the output of the filtering means, a balanced bridge indicating circuit including a meter connected to the voltage doubling means to give an indication of the signal applied which is proportional to the R.M.S. welding current, and manual grounded switching means connected to the balanced bridge indicating circuit to remove the signal applied and prepare the meter for the next measurement.

References Cited in the file of this patent

UNITED STATES PATENTS

| | | |
|---|---|---|
| 2,434,155 | Haynes | Jan. 6, 1948 |
| 2,740,044 | Storm | Mar. 27, 1956 |
| 2,748,380 | Platte | May 29, 1956 |
| 2,752,467 | Peretz | June 26, 1956 |
| 2,791,747 | Rosenthal | May 7, 1957 |
| 2,871,447 | Hall | Jan. 27, 1959 |

OTHER REFERENCES

Publication: "Toroid Measures Spot Weld Current," by P. M. Zimmerman, pages 132 and 133 of Electronics, Dec. 1, 1957.